(12) United States Patent
Tammela et al.

(10) Patent No.: US 7,559,706 B2
(45) Date of Patent: Jul. 14, 2009

(54) LIGHT AMPLIFYING FIBER ARRANGEMENT

(75) Inventors: Simo Tammela, Espoo (FI); Per Stenius, Espoo (FI)

(73) Assignee: Liekki Oy, Lohja (FI)

( * ) Notice: Subject to any disclaimer, the term of this patent is extended or adjusted under 35 U.S.C. 154(b) by 0 days.

(21) Appl. No.: 11/896,373

(22) Filed: Aug. 31, 2007

(65) Prior Publication Data

US 2008/0062508 A1  Mar. 13, 2008

Related U.S. Application Data

(63) Continuation-in-part of application No. 11/358,111, filed on Feb. 22, 2006, now Pat. No. 7,455,464.

(60) Provisional application No. 60/843,428, filed on Sep. 11, 2006.

(51) Int. Cl.
*G02B 6/255* (2006.01)

(52) U.S. Cl. .............................. 385/95; 385/15; 385/31; 385/39

(58) Field of Classification Search .................. 385/15, 385/31, 39, 95
See application file for complete search history.

(56) References Cited

U.S. PATENT DOCUMENTS

| 4,291,940 A | 9/1981 | Kawasaki et al. |
|---|---|---|
| 4,673,243 A | 6/1987 | Yamashita et al. |
| 4,720,160 A | 1/1988 | Hicks, Jr. |
| 4,815,079 A | 3/1989 | Snitzer et al. |
| 5,818,630 A | 10/1998 | Fermann et al. |
| 5,854,865 A | 12/1998 | Goldberg |
| 5,864,644 A | 1/1999 | DiGiovanni et al. |
| 5,999,673 A | 12/1999 | Valentin et al. |
| 6,370,297 B1 | 4/2002 | Hakimi et al. |

(Continued)

FOREIGN PATENT DOCUMENTS

CA     2362992 A1    8/2000

(Continued)

OTHER PUBLICATIONS

Pavel Peterka et al; Laser Performance of Double-Clad Er/Ub Doped Fiber with Cross-Section Tailored for Direct Splicing to the Pump and Signal Fibers; IREE, May 23, 2003; pp. 1-14.

(Continued)

*Primary Examiner*—Jennifer Doan
(74) *Attorney, Agent, or Firm*—Venable LLP; Eric J. Franklin (57) ABSTRACT

A light-amplifying fiber arrangement including a pump fiber including glass and a bridge element. At least a portion of a side of the bridge element has been fused to at least a portion of a side of the pump fiber. An active fiber includes a light-amplifying core and a first cladding. The first cladding includes glass. At least a portion of a side of the active element has been fused to at least a portion of a side of the bridge element. A second cladding surrounds the pump and active fibers in order to confine pump light to the fibers. The second cladding includes glass. The arrangement allows coupling of high power levels into the pump fiber, wherein splicing of pigtails to the arrangement is easier than e.g. in case of conventional doubly clad fibers.

11 Claims, 11 Drawing Sheets

U.S. PATENT DOCUMENTS

| | | | |
|---|---|---|---|
| 6,397,636 | B1 | 6/2002 | DiGiovanni et al. |
| 6,434,295 | B1 | 8/2002 | MacCormack et al. |
| 6,434,302 | B1 | 8/2002 | Fidric et al. |
| 6,778,562 | B2 | 8/2004 | Bayart et al. |
| 6,813,428 | B2 | 11/2004 | Bayart et al. |
| 6,816,658 | B2 | 11/2004 | Bayart et al. |
| 6,826,335 | B1 | 11/2004 | Grudinin et al. |
| 7,206,481 | B2 * | 4/2007 | Quinn et al. ............... 385/100 |
| 7,212,716 | B2 | 5/2007 | Arimondi et al. |
| 2004/0052484 | A1 | 3/2004 | Broeng et al. |
| 2004/0071423 | A1 | 4/2004 | Libori et al. |
| 2006/0204186 | A1 | 9/2006 | Tammela et al. |

FOREIGN PATENT DOCUMENTS

| | | |
|---|---|---|
| CA | 2368778 A1 | 10/2000 |
| EP | 1054276 A1 | 11/2000 |
| FR | 2822242 A1 | 9/2002 |
| WO | WO-89/09942 A1 | 10/1989 |
| WO | WO-96/20519 A1 | 7/1996 |
| WO | WO-00/49435 A1 | 8/2000 |
| WO | WO-00/67350 A1 | 11/2000 |
| WO | WO-03/017440 A2 | 2/2003 |
| WO | WO-2004/083921 A1 | 9/2004 |
| WO | WO-2006/090002 A1 | 8/2006 |

OTHER PUBLICATIONS

Pavel Peterka et al; Laser Performance of Double-Clad Er/Yb Doped Fiber with Cross-Section Tailored for Direct Splicing to the Pump and Signal Fibers; CTuQ7.pdf; 2-pages, 2006.

Pavel Peterka et al; Experimental demonstration of novel end-pumping method for double-clad fiber devices; Optics Letters; vol. 31, No. 22; Nov. 15, 2006; pp. 3240-3242.

PCT/ISA/210—International Search Report—Jun. 17, 2004.

PCT/ISA/237—Written Opinion of the International Searching Authority—Jun. 17, 2004.

* cited by examiner

LIGHT AMPLIFYING FIBER ARRANGEMENT

CROSS-REFERENCE TO RELATED APPLICATIONS

This application is a continuation-in-part of U.S. application Ser. No. 11/358,111, filed 22 Feb. 2006, the entire contents of which are hereby incorporated by reference. This application claims priority from U.S. Provisional Application Ser. No. 60/843,428, filed 11 Sep. 2006, the entire contents of which are hereby incorporated by reference.

FIELD OF THE INVENTION

The present invention relates to light-amplifying waveguides.

BACKGROUND

Lasers and optical amplifiers may be implemented e.g. by using light-amplifying double clad fibers. A double clad fiber may comprise a core consisting of e.g. silica glass doped with erbium (Er) or ytterbium (Yb). The double clad fiber comprises an inner cladding surrounding the core, and an outer cladding surrounding the inner cladding.

An optical signal propagating in the core may be amplified if population inversion is provided in the core. The population inversion may be established by coupling pump light into the inner cladding. The pump light propagating in the inner cladding partly escapes from the inner cladding into the core where the pump light may be absorbed by the dopant ions, thereby maintaining the population inversion.

Simultaneous coupling of the signal and pump light into the fiber and out of the doubly clad fiber is problematic due to the concentric structure of the doubly clad fiber.

U.S. Pat. No. 6,826,335 discloses an optical fiber arrangement comprising at least two fiber sections, wherein the sides of said fiber sections are in optical contact with each other so that at least one of the sections can be separated from the other sections by pulling.

SUMMARY

An object of the present invention is to provide a light-amplifying fiber arrangement.

According to a first aspect of the invention, there is provided a light-amplifying fiber arrangement comprising:
  a pump fiber comprising glass,
  a bridge element comprising glass, wherein at least a portion of a side of said bridge element has been fused to at least a portion of a side of said pump fiber,
  an active fiber comprising a light-amplifying core and a first cladding, said first cladding comprising glass, wherein at least a portion of a side of said active element has been fused to at least a portion of a side of said bridge element, and
  a second cladding surrounding said pump and active fibers in order to confine pump light to said fibers, wherein said second cladding comprises glass.

The arrangement allows coupling of high power levels into the pump fiber, wherein splicing of pigtails to the arrangement is easier than e.g. in case of conventional doubly clad fibers.

According to a second aspect of the invention, there is provided a light-amplifying fiber arrangement comprising:
  an active fiber comprising at least one stress-inducing element and a light-amplifying core,
  a pump fiber, wherein at least a portion of a side of said pump fiber has been fused to at least a portion of a side of said active fiber in order to allow transverse coupling of pump light from said pump fiber to said active fiber.

The light-amplifying fiber arrangement may be a bridge fiber or a figure-8-fiber. The figure-8-fiber comprises a pump fiber and an active fiber, wherein the side of the pump fiber is fused to the side active fiber. The name "figure-8" refers to the shape of the cross-section.

The bridge fiber comprises a pump fiber, an active fiber, and an elongated bridge element which is connected between the sides of the pump and active fibers by fusing. The active fiber comprises a light-amplifying core surrounded by a cladding.

The pump fiber and the active fiber are attached to each other lengthwise either directly or by means of a bridge element. This allows coupling of pump light from the pump fiber into the core of the active fiber.

According to a third aspect of the invention, there is provided a method of splicing optical fibers to a bridge fiber, said method comprising splicing a first fiber to an end of the active fiber and splicing a second fiber to an end of said pump fiber such that said the end of the active fiber and the end of the pump fiber are in contact with the bridge element during said splicing.

Pump light is coupled into an end of said pump fiber to form a light beam propagating in the pump fiber substantially in the longitudinal direction. A part of said propagating beam is transversely coupled into the cladding of the active fiber in order to maintain the population inversion in the core of the active fiber.

Modifying of the manufacturing process in order to change the dimensions of produced fiber arrangements is rather easy. Consequently. The pump fiber geometry and the active fiber geometry may be selected substantially independently.

This allows coupling of radiation from high power diodes or diode arrays to the fiber arrangements of near arbitrary dimensions.

The fiber arrangement may be substantially immune to back-reflections.

The refractive index of the pump fiber may be substantially equal to the cladding of the active fiber. Thus, the material of the pump fiber may have a lower refractive index than in case of a doubly clad fiber.

The active core of the fiber arrangement may be polarization-maintaining. Thus, the fiber arrangement may be compatible with further polarization-maintaining fibers.

The arrangement is asymmetric, which facilitates effective transfer of optical power from the pump fiber to the doped core of the active fiber. The asymmetric geometry forces the rays of the pump light to intersect the core. The asymmetry geometry naturally suppresses the propagation of the ineffective helical modes in the pump fiber.

In an embodiment, the active fiber and the pump fiber are fused together already in the preform phase. The pump fiber and the active fiber may be drawn together, which may allow a substantial reduction in manufacturing costs when compared with drawing the fibers separately.

The fiber arrangement may be manufactured without spinning of a preform.

According to a fourth aspect of the invention, there is provided a fiber-optic laser.

According to a fifth aspect of the invention, there is provided an optical amplifier.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention are described in more detail with reference to the appended drawings, in which.

DETAILED DESCRIPTION

Figure 1:
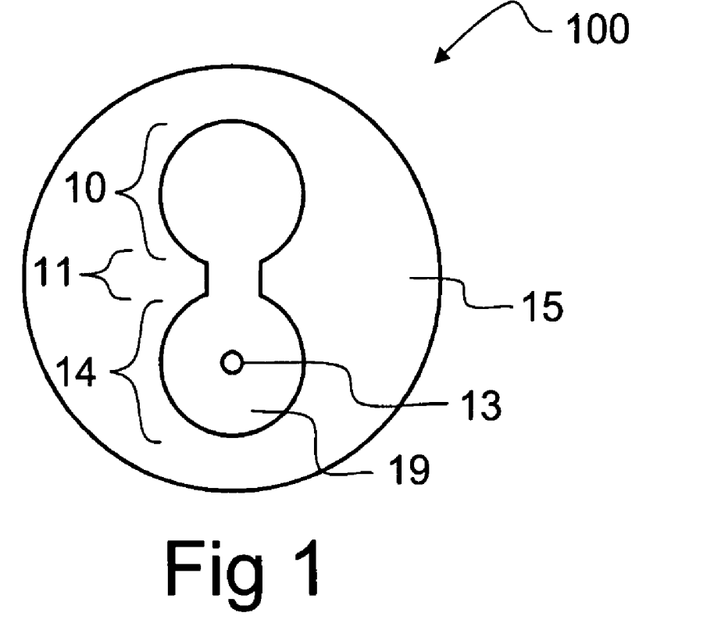
FIG. 1 shows, in a cross sectional view, a bridge fiber.

Referring to FIG. 1, a bridge fiber 100 comprises a pump element 10, an active element 14, and a bridge element which connects the sides of the pump element 10 and the active element together. The pump element 10, the active element 14, and the bridge element 11 are longitudinal elements. In particular, the pump element 10, the active element 14, and the bridge element 11 may be fibers and/or rods (See also FIGS. 9 and 10). The longitudinally extending surface of the pump element 10 may be fused to the longitudinally extending surface bridge element 11. The longitudinally extending surface of the active element 14 may be fused to the longitudinally extending surface bridge element 11. The longitudinal joint between the elements comprises fused glass. In particular the longitudinal joint between the elements may consist of fused glass. Thus, the elements 10, 11, 14 are also portions of a fused arrangement.

The combination of the elements 10, 11, 14 may be surrounded by a cladding 15. In other words, the cladding 15 may encase the elements 10, 11, 14.

The active element 14 comprises a cladding 19 and a waveguiding core 13. The cladding 19 may comprise or consist of a glass. The core 13 of the active element 14 may comprise e.g. silica glass doped with at least one dopant selected from the group of rare earth elements. The core 13 of the active element 14 may comprise e.g. silica glass doped with at least one dopant selected from the group of Ytterbium, Erbium, Neodymium, Praseodymium, Thulium, Samarium, Holmium, Dysprosium, a transition metal or a semiconductor. The pump element and/or the bridge element may be rods of silica glass. The cladding 15 may be e.g. of a polymer. The cladding 15 may be e.g. silicone resin or fluoropolymer.

The core 13 has a higher refractive index than the cladding 19 of the active element. The refractive index of the bridge element 11 is greater than or equal to the refractive index of the cladding 19. The refractive index of the pump element 10 is greater than or equal to the refractive index of the bridge element 11.

The core 13, the cladding 19, the bridge element 11 and/or the pump element 10 may be doped or co-doped in order to adjust the refractive index. The dopant or co-dopant may be selected from a group consisting of aluminium, boron, germanium or phosphor.

The dimensions of the core 11 may be selected to allow single mode or multimode propagation of signal light longitudinally within said core 11.

The core 13 of the active element 14 may have a large mode area in order to overcome thermal limitations in the fiber core and/or to increase the threshold power level for nonlinearities. The effective mode area may be selected to be e.g. greater than or equal to 200 $\mu m^2$. The active element 14 may be dimensioned to be a single mode fiber, or to support only 2-4 transverse modes.

The dimensions of the active element 14 and the pump element 10 may remain substantially constant throughout the length of said elements 10, 14.

The pump element 10, the active element 14, the core 13 of the active element 14, and the bridge element 11 are waveguiding, i.e. they confine light by total internal reflection at their outer surface.

The dimensions of the pump element 10 may be selected to allow single mode or multimode propagation of pump light longitudinally along said pump element 10.

The bridge element 11 may have one or more longitudinal holes or elements to enhance mode mixing, i.e. to enhance coupling of pump light into the core 13. The bridge element 11 may be a tubular element.

The elements 10, 14 may be substantially straight or twisted about each other to form a twisted pair of fibers.

Figure 2:
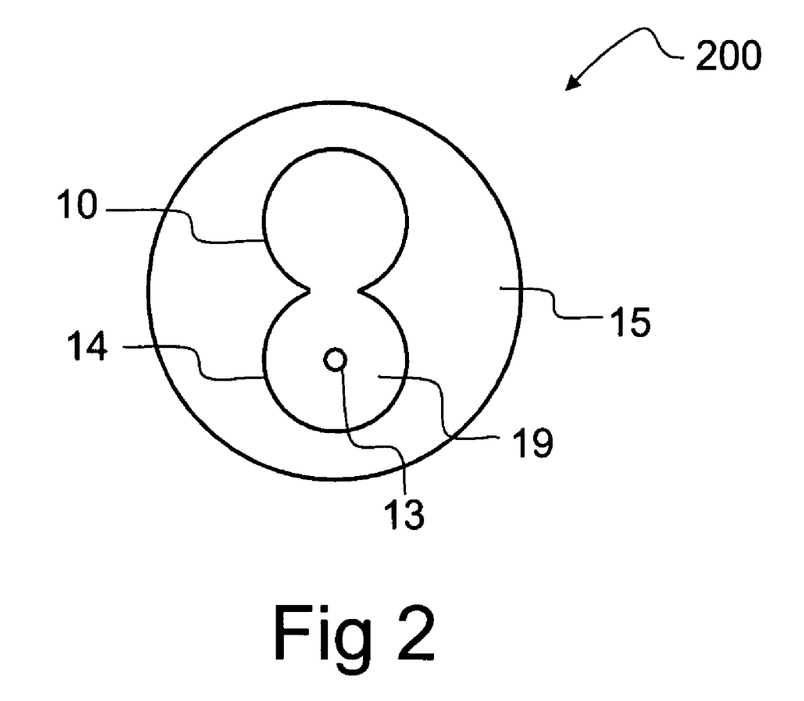
FIG. 2 shows, in a cross sectional view, a figure-8-fiber.

Referring to FIG. 2, a figure-8-fiber comprises a pump element 10, and an active element 14 such that their sides are connected together. The name "figure-8" refers to the cross-sectional form of said structure. The pump element 10, the active element 14, and the bridge element 11 are longitudinal elements, in particular fibers and/or rods (See FIGS. 9 and 10). The combination of the elements 10, 11, 14 may be surrounded by a cladding 15. The cladding 15 may comprise or consist of glass or polymer.

The core 13 has a higher refractive index than the cladding 19 of the active element. The refractive index of the pump element 10 is greater than or equal to the refractive index of the cladding 19.

Figure 3:
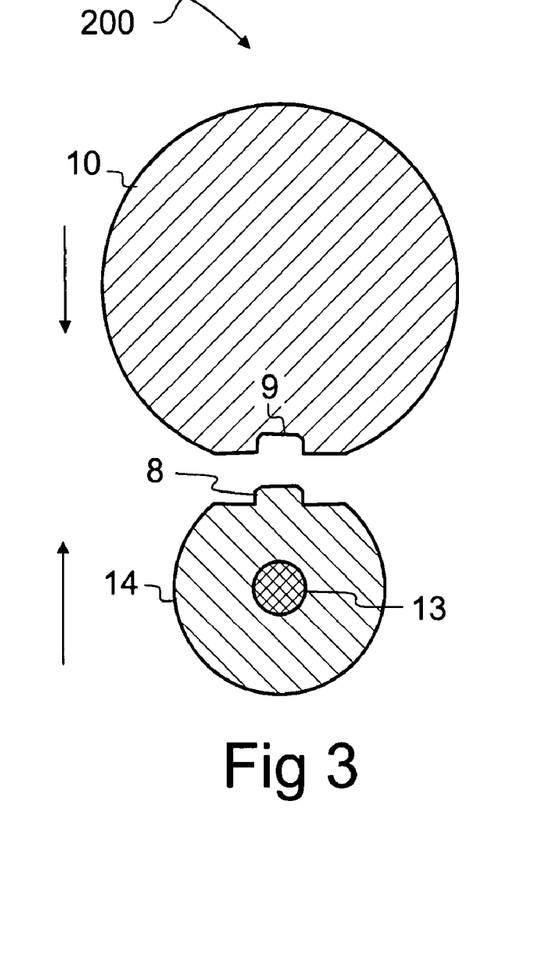
FIG. 3 shows, in a cross sectional view, a method of producing a figure-8-fiber.

Referring to FIG. 3, the sides of the pump 10 and active 14 elements may be connected together to implement a figure-8-fiber. Said method may comprise:
providing at least one groove 9 on the side of a first element or on the side of its undrawn precursor,
providing at least one ridge 8 on a side of second element or on the side of its undrawn precursor,
positioning said ridge 8 into said groove 9, and
joining said elements or undrawn precursors together.

Instead of or in addition to the grooves and ridges, the active element 14 and/or the pump element may have an additional coating of a glass. The composition of said glass may be selected so that it is softened at a lower temperature than the bulk material of said elements 10, 14, in order to facilitate fusing said elements 10, 14 together.

Figure 4:
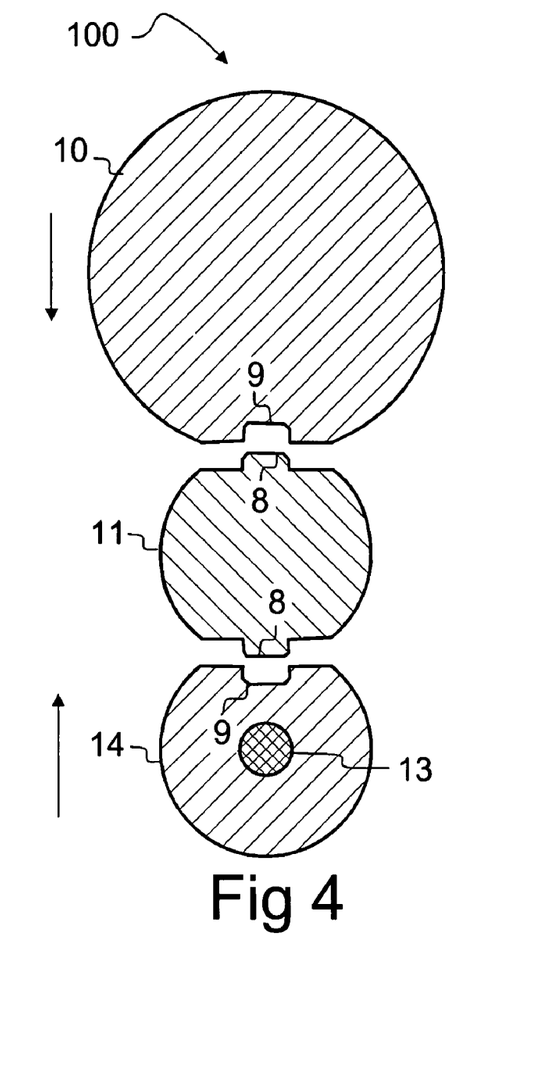
FIG. 4 shows, in a cross sectional view, a method of producing a bridge fiber.

Referring to FIG. 4, the manufacturing of a bridge fiber 100 may comprise positioning a bridge element 11 between the pump element 10 and the active element 14. The elements 10, 11, 14 may comprise grooves 9 and/or ridges 8 to facilitate the positioning.

The grooves 9 and/or ridges 8 may be implemented by mechanical working, e.g. by sawing, milling or grinding.

The composition of the bridge element 11 may be selected such that it is softened at a lower temperature than the active element 10 and/or the pump element 10.

The width of the bridge element 11 may be selected to be smaller than the widths of the elements 10, 14 so that the bridge element 11 is softened faster than the active element 10 and/or the pump element 10, when the elements 10, 11, 14 are fused together.

Figure 5:
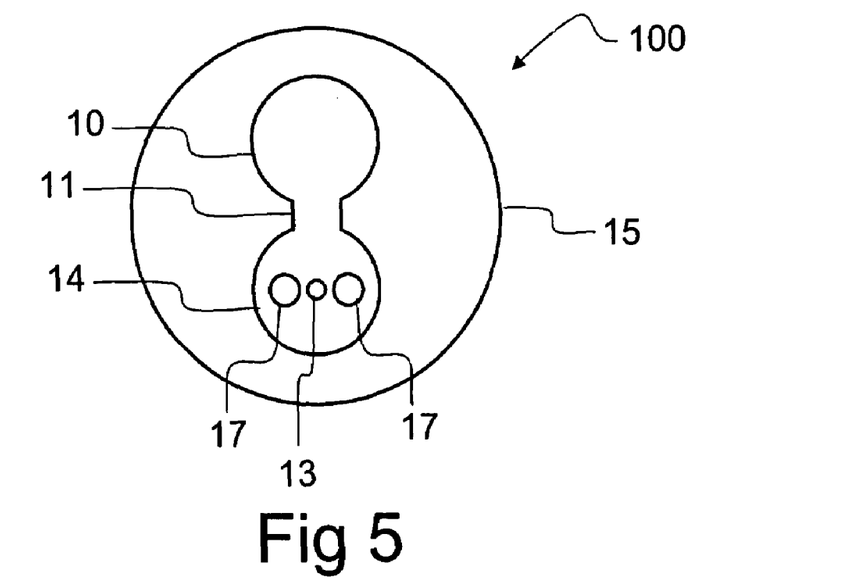
FIG. 5 shows, in a cross sectional view, a polarization maintaining bridge fiber comprising stress inducing elements.

Referring to FIG. 5, the active element 14 may comprise one or more stress-inducing elements 17 to implement a polarization-maintaining active element 14.

In particular, the active element 14 may comprise two stress-inducing elements 17. In particular, two stress-inducing elements 17 may be substantially round and positioned symmetrically around the core 13 in order to implement a structure known as the PANDA fiber (The "PANDA" refers to the resemblance to the face of a panda bear—two eyes and a nose).

The stress-inducing elements 17 may be substantially parallel to the core 13

Also the active element 14 of a figure-8-fiber may comprise one or more stress-inducing elements 17 to implement a polarization-maintaining element 14.

The active element 14 and/or the bridge element 11 may comprise photonic structures.

The cross sectional form of the core 13 may be elliptical in order to implement a polarization-maintaining active element 14.

Figure 6:
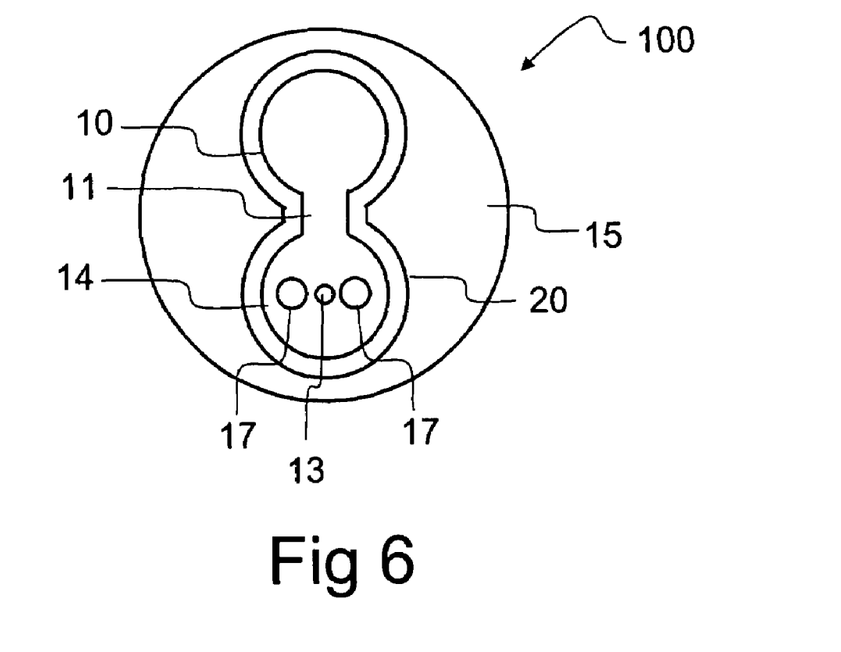
FIG. 6 shows, in a cross sectional view, a bridge fiber having a glass cladding and stress-inducing elements.

Referring to FIG. 6, the combination of the elements 10, 14 may be surrounded by a glass cladding 20 in order to confine pump light to said elements 10, 14. The glass cladding 20 may, in turn, be surrounded by a second cladding or cover layer 15. The structure of FIG. 6 may comprise the bridge element 11 and/or stress-inducing elements 17.

Light amplifying fiber arrangements 100, 200 having the glass cladding 20 may handle higher optical power than the fiber arrangements 100, 200 without the glass cladding. The glass cladding 20 may be implemented e.g. by a sol-gel process or by conventional deposition techniques. The glass cladding 20 may also be implemented by a method described with reference to FIGS. 14a and 14b.

The cladding 19 of the active element 14, the cladding 20, and/or the bridge element 11 may consist of doped glass. Hence, the cladding 19 of the active element 14, the cladding 20, and/or the bridge element 11 may comprise glass.

The cladding 20 may be surrounded by a polymer cladding 15. The polymer cladding may be e.g. polyimide, silicone rubber, or fluoropolymer.

Also the structures shown in FIGS. 1, 2, and 5 may have the glass cladding 20 in addition to the cladding 15.

The glass-clad fiber arrangement may also be implemented without the bridge element 11 and/or without the stress-inducing elements 17. In other words, a bridge fiber 100 or a figure-8-fiber 200 may comprise a cladding 20 surrounding the combination of the active element 14, the bridge element 11, and the pump element 10 in order to pump light to said elements 10, 11, 14, wherein said bridge fiber 100 or a figure-8-fiber 200 does not comprise stress-inducing elements 17.

Figure 7:
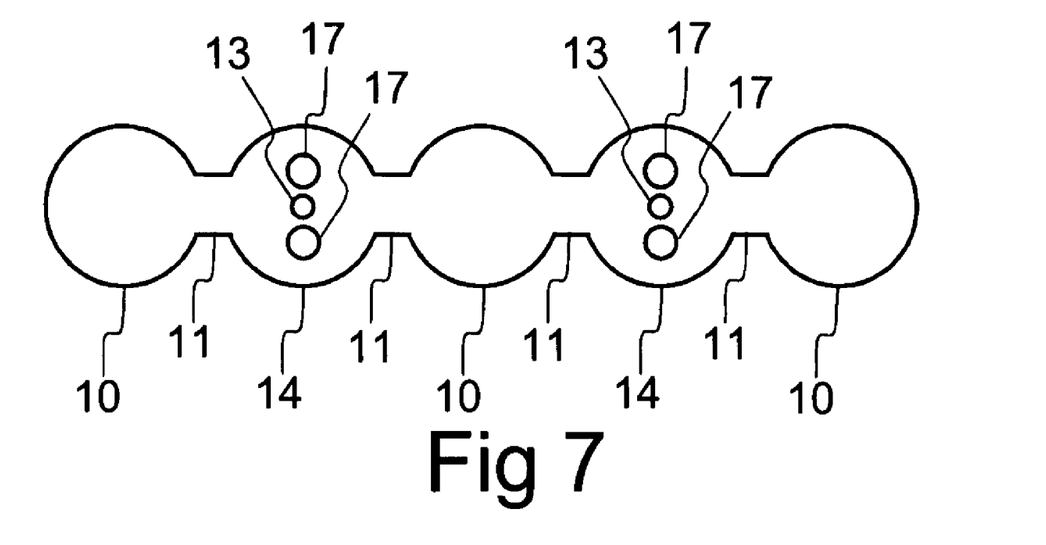
FIG. 7 shows, in a cross sectional view, a bridge fiber comprising several pump elements and several active elements.

Referring to FIG. 7, a bridge fiber 100 may comprise several pump elements 10 and at least one active element 14 which are connected together by using bridge elements 11. A bridge fiber may comprise several active elements 14 and at least one pump element 10 which are connected together by using bridge elements 11.

Figure 8:
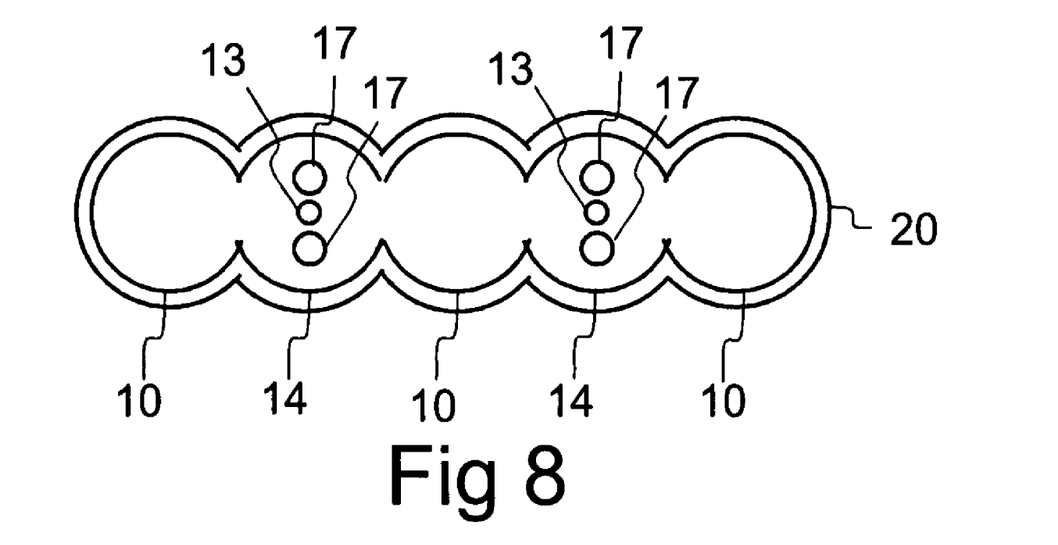
FIG. 8 shows, in a cross sectional view, a glass clad fiber arrangement comprising several pump elements and several active elements.

Referring to FIG. 8, the light amplifying arrangement may comprise several pump elements 10 and at least one active element 14 which are connected together without using bridge elements 11. A light amplifying fiber arrangement may comprise several active elements 14 and at least one pump element 10 which are connected together without using bridge elements 11.

The fiber structures of FIG. 7 and FIG. 8 may also have the further glass cladding 20.

Figure 9:
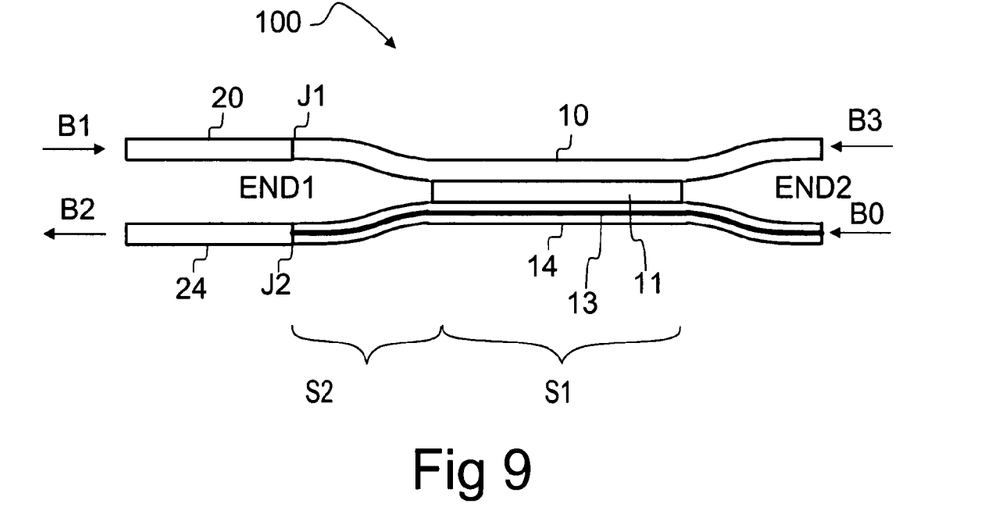
FIG. 9 shows, in a side view, pigtails spliced to the pump element and to the active element, wherein the ends of said elements are separate from each other.

Referring to FIG. 9, a first portion S1 of a bridge fiber 100 may comprise a pump element 10 and an active element 14 which are connected together by the bridge element 11. A second portion S2 of a bridge fiber 100 may comprise a portion of said pump element 10 and a separate portion of said active element 14. In other words, the ends J1, J2 of the elements 10, 14 may be separate from each other. The end J1 of the pump element 10 may be spliced to a first pigtail 20, and the end J2 of the active element 14 may be spliced to a second pigtail 24.

The pigtails 20, 24 may be single or multimode optical fibers or optical fiber bundles.

Pump light B1 may be coupled through the first pigtail 20 into the pump element 10 in order to pump the active element 14. A weak signal B0 may be coupled into the core 13 of the active element 14. Amplified signal light B2 provided by the active element 14 may be coupled out of the active element 14 through the second pigtail 24.

The signal light B2 may be adapted to propagate in a direction opposite the direction of the pump light B1 in the bridge fiber 100.

The signal light B2 may be adapted to propagate in the same direction as the pump light B1 in the bridge fiber 100.

In addition, second pump light B3 may be coupled to a second end of the pump element 10 so as to pump the bridge fiber 100 from two opposite directions.

Pump light B1, B3 may be coupled into both ends of the pump element 10.

A portion of the bridge element 11 may be removed in order to allow separation of the ends J1, J2 and in order to facilitate splicing. The bridge element 11 may be removed e.g. by sawing, laser micromachining, melting, etching or dissolving.

The ends J1 and J2 are in a first end END1 of the bridge fiber 100. The bridge fiber 100 has also the other end END2.

Figure 10:
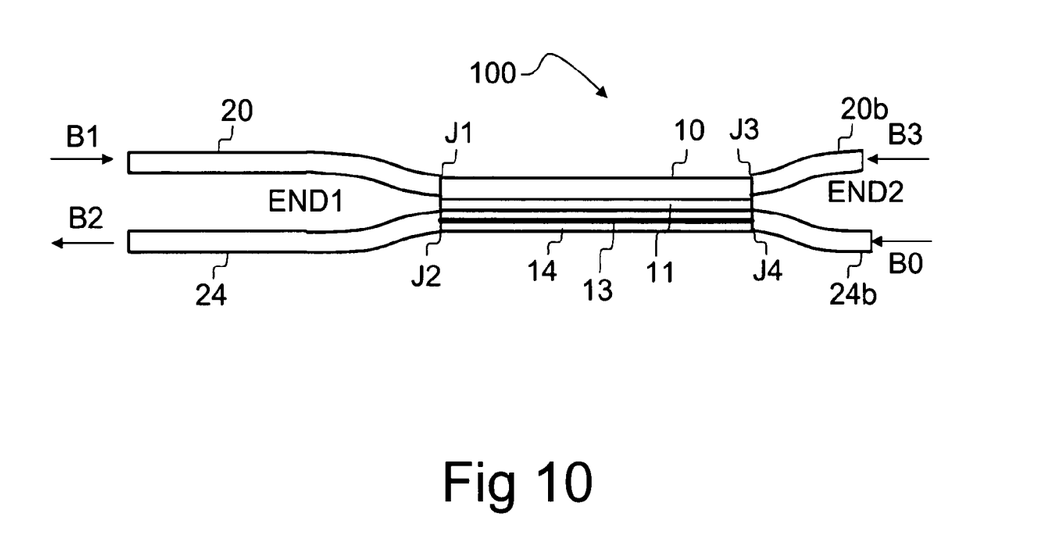
FIG. 10 shows, in a side view, pigtails spliced to the pump element and to the active element without separating the pump element from the active element.

Referring to FIG. 10, the ends J1, J2 of the pump element 10 and the active element 14 may be connected together directly or by the bridge element 11. The end J1 of the pump element 10 may be spliced to a first pigtail 20, and the end J2 of the active element 14 may be spliced to a second pigtail 24.

In particular, the ends J1, J2 may be spliced simultaneously, without separating the said ends J1, J2 from each other. Simultaneous splicing of the ends J1, J2 is advantageous when the bridge fiber 100 or a figure-8-fiber has the glass cladding 20. Thus, the glass cladding 20 may remain substantially unbroken during and after the splicing.

The splicing may be carried out e.g. by a fusion splicing device provided by a Swedish company Erisson Network Technologies AB under a name "RSU 8 fusion splicer".

In certain cases, the sides of the pigtails 20, 24 may be partially fused together in an uncontrolled way. Thanks to the bridge element 11, the pigtails 20, 24 may remain substantially separate during the fusion splicing. Consequently, the optical properties of the pigtails 20, 24 are not degraded due to the fusion splicing.

Pump light B1 may be coupled through the first pigtail 20 into the pump element 10 in order to pump the active element 14. Weak signal light B0 may be coupled into the core 13 of the active element 14. Amplified signal light B2 provided by the active element 14 may be coupled out of the active element 14 through the second pigtail 24.

Instead of amplifying in-coupled weak signal light B0, the active element 14 may also amplify spontaneous emission generated in the core 13.

Further pigtails 20b, 24b may be spliced to the other ends J3, J4 of the elements 10, 14. The ends J3, J4 are in the second end END2 of the bridge fiber 100.

The signal light B2 may be adapted to propagate in a direction opposite the direction of the pump light B1 in the bridge fiber 100.

The signal light B2 may be adapted to propagate in the same direction as the pump light B1 in the bridge fiber 100.

In addition, second pump light B3 may be coupled to the second end of the pump element 10 so as to pump the bridge fiber 100 from two opposite directions.

Pump light B1, B3 may be coupled into the pump element also by the EMSP-method, i.e. by coupling pump light into one or more indentations of the pump element 10.

Signal light B2 may also coupled be out of the core 13 by the EMSP-method, i.e. by using indentations of the active element 10. Weak signal light B0 may be coupled into the core by using indentations of the active element 14.

The fiber may be scaled to multi-core and multi-pump guide structures. As a fully fused solution, the bridge fiber provides a significant improvement in the state-of-the art of known combiners by:

- providing a very cost effective and easy to manufacture solution,
- providing a design that can be without added cost adapted to any geometry in a very flexible way,
- offering a simple way to realize pump combiners both for high power as well as polarization maintaining applications,
- substantially enhancing the coupling efficiency between the pump and signal fibers and improving the pump absorption, and
- eliminating the need for complex and costly drawing procedures such as spinning the preform.

By 11 Aug. 2006, several proof-of-concept bridge fibers had been fabricated. Those fibers exhibited high coupling efficiency, low losses and high power conversion efficiency.

Figure 11A:
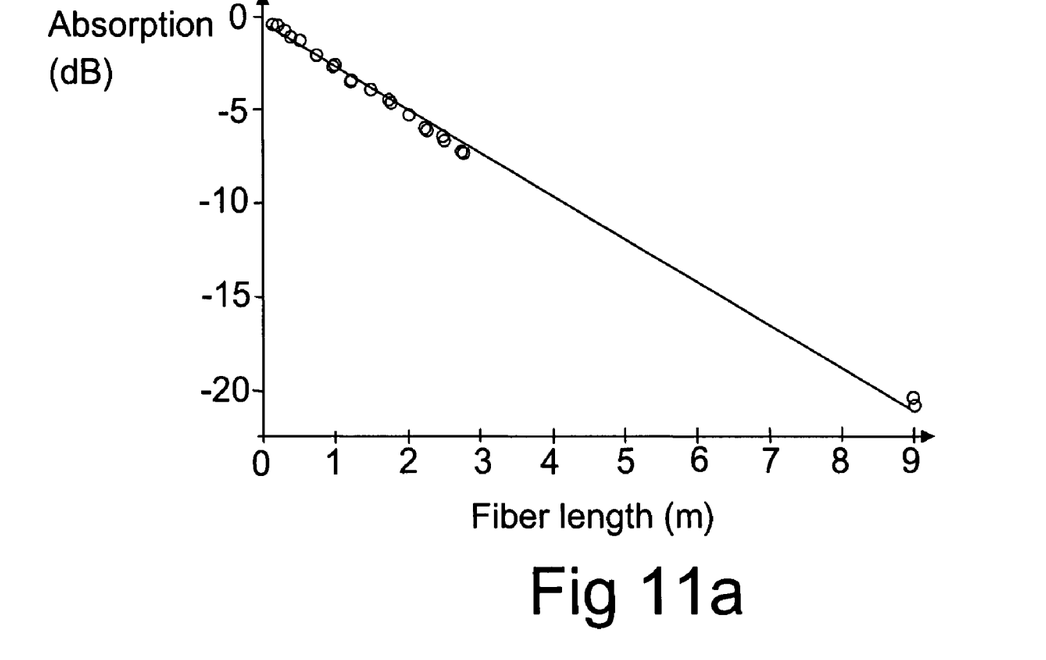
FIG. 11a is a plot showing the absorption of the pumping light at the wavelength of 805 nm in a bridge fiber as a function of the fiber length.

FIG. 11a shows absorption of pump radiation B1 at the wavelength 805 nm as a function of fiber length for a bridge fiber 100. The equation of the regression line was found to be y=−2.306x−0.3668 wherein x denotes the length in meters and y denotes the absorption in dB-units. Thus, the fiber 100 was demonstrated to have high pump absorption 2.3 dB/m at 805 nm.

Figure 11B:
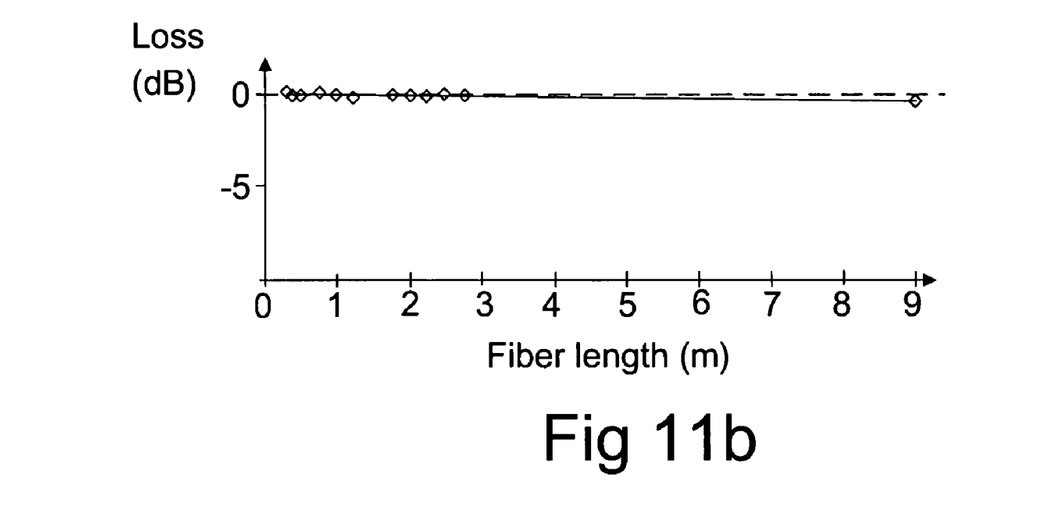
FIG. 11b is a plot showing the losses at the wavelength of 920 nm in the bridge fiber of FIG. 11b as a function of the fiber length.

FIG. 11b shows losses of signal light B2 at a wavelength 920 nm as a function of the fiber length, for the bridge fiber of FIG. 11a. The equation of the regression line was found to be y=−0.0419x−0.0241, wherein x denotes the length in meters and y denotes the losses in dB-units. Thus, the fiber 100 was demonstrated to have very low losses of approximately 0.04 dB/m at 920 nm.

Figure 12:
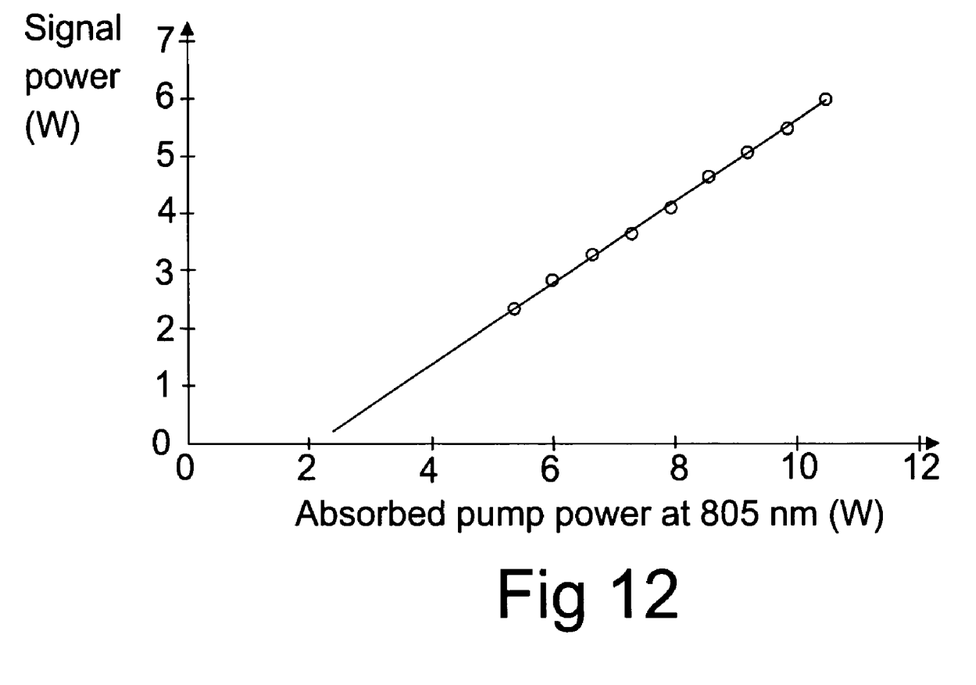
FIG. 12 is a plot showing the signal power provided by a bridge fiber as a function of absorbed pump power at 805 nm.

FIG. 12 shows generated signal power as a function of the pump power for the bridge fiber 100 of FIG. 11a. The pump light is at 805 nm and the signal light is at 902 nm. The slope efficiency is approximately 71%, which is comparable to that of a conventional double clad fiber. Thus, the bridge configuration does not substantially degrade the optical performance when compared to the conventional double clad fiber.

The bridge fiber 100 and/or figure 8 fibers 200 described above may be used to implement e.g. fiber lasers or optical amplifiers. The optical amplifiers may be used e.g. to amplify optical data signals in fiber optical communications systems.

Figure 13:
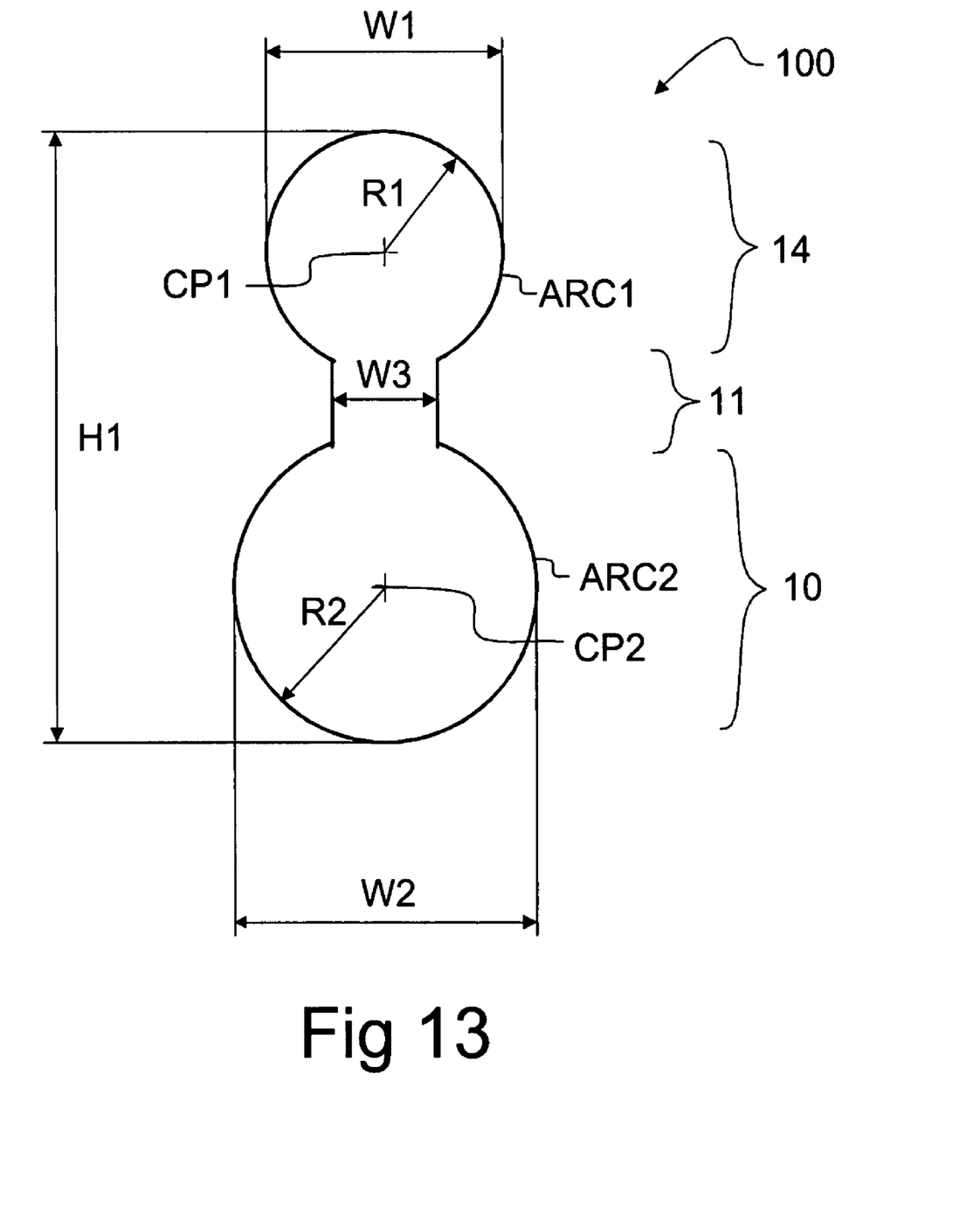
FIG. 13 shows, in a cross sectional view, dimensions of a bridge fiber.

Referring to FIG. 13, a bridge fiber 100 comprises a pump element 10, a bridge element 11, and an active element 14. The pump element 10 may be considered to be a pump portion. The bridge element 11 may be considered to a bridge portion. The active element 14 may be considered to be an active portion.

When viewing the cross-sectional form of a bridge fiber 100, the pump element 10 has a width W2, the bridge element 11 has a width W3, and the active element 14 has a width W1. The bridge fiber 100 has a height H1. The height H1 of the bridge fiber 100 may be greater than the sum of the active fiber width W1 and the pump fiber width W2. In other words, H1 may be greater than W1+W2.

The bridge element may be formed, for example, of a rod having a width W3 which is smaller than or equal to W2. Consequently, The height H1 of the bridge fiber 100 may be smaller than or equal to W1+2×W2. "×" denotes multiplication.

In particular, the height H1 of the bridge fiber 100 may be greater than 1.05×W1+W2 and smaller than or equal to W1+2×W2.

The bridge fiber 100 may be produced by fusing substantially round fibers and/or rods and/or preforms together. The form of the round perimeters may be substantially preserved also in the fused combination. Thus, the border of the active element 14 may be a substantially circular arc ARC1 having a radius R1 and a center point CP1. The border of the pump element 10 may be a circular arc ARC2 having a radius R2 and a center point CP2.

The elements 10, 14 are not directly in contact with each other but via the bridge element 11. The distance between the center points CP1, CP2 in the bridge fiber 100 may be greater than the sum R1+R2 of the radii of the active and pump elements 14, 10.

The first cladding 19 of the active element 14 is taken into consideration when determining the width W1. The bridge fiber 100 may have further claddings 19, 20 but these are not taken into consideration when determining the dimensions W1, W2, W3, H1, R1, R2.

Figure 14A:
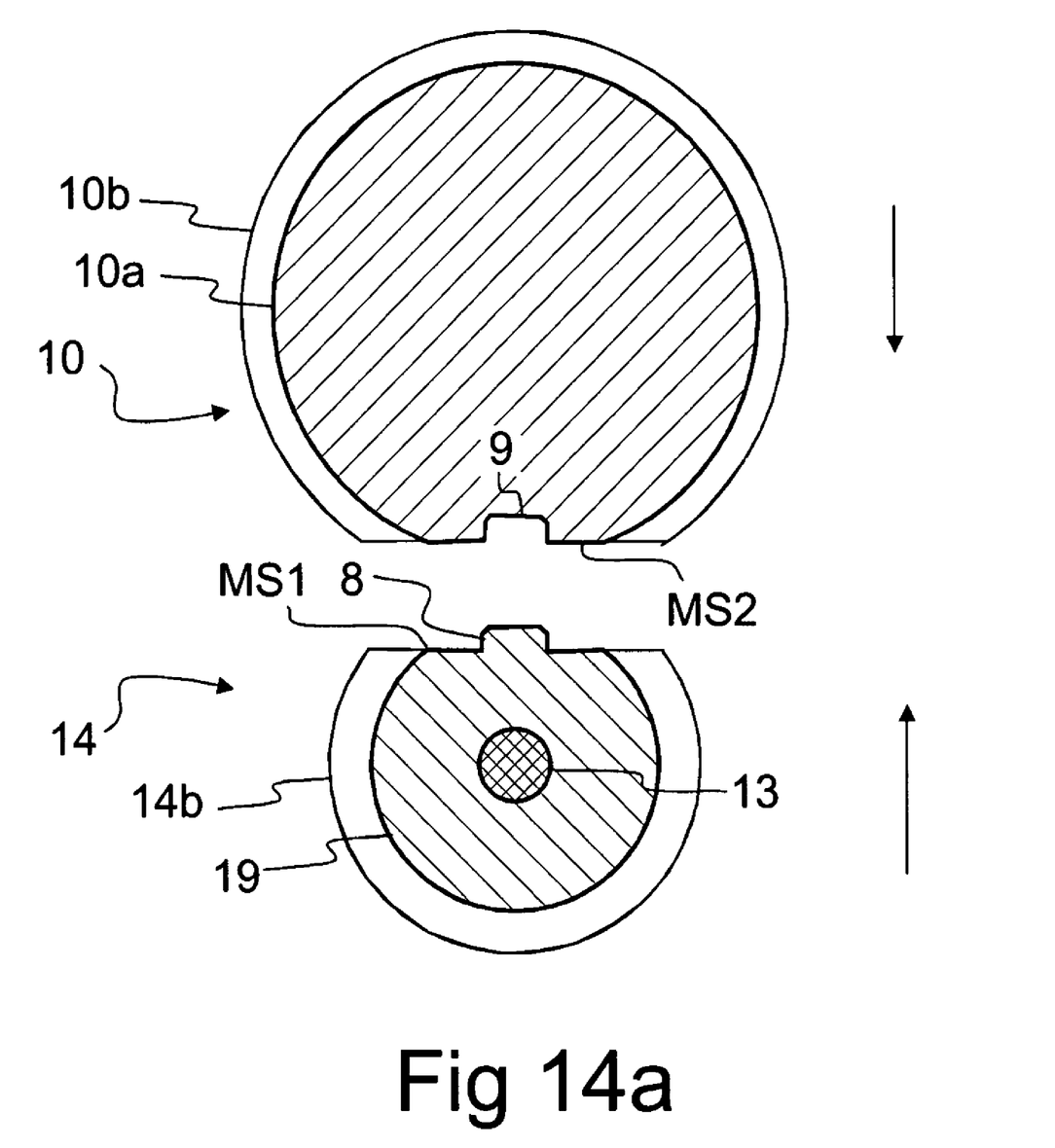
FIG. 14a shows, in a cross sectional view, a method for producing a glass-clad figure-8-fiber.

Referring to FIG. 14a, a glass-clad figure 8 fiber may be produced by fusing a glass-clad pump element 10 and a glass-clad active element 14 together. The separate glass-clad pump element 10 comprises an inner portion 10a and an outer portion 10b. The separate glass-clad active element 14 comprises a first cladding 19 (see FIG. 1) and a second cladding 14b.

The glass cladding are at least partially removed from the mating surfaces MS1, MS2 of the elements 10, 14 prior to the fusing.

The elements 10, 14 may further comprise one or more grooves 9 and ridges 8 in order to facilitate positioning and fusing.

Upon the fusing, the outer portion 10b and the second cladding 14b are joined together to form the substantially continuous cladding layer 20 (See FIG. 6), which surrounds the pump element 10 and the active element 14. The continuous cladding 20 has a lower refractive index than the inner portion 10a and the first cladding 19, in order to confine light.

A method of producing a glass-clad fiber arrangement may thus comprise:
  providing a glass-clad pump element 10 comprising an inner portion 10a and an outer portion 10b,
  glass-clad active element 14 comprising a first cladding 19 (see FIG. 1) and a second cladding 14b,
  at least partially removing the outer portion 10b from a first mating surface MS1 of said pump element,
  at least partially removing the first cladding 19 from a second mating surface MS2 of said active element,
  fusing said first mating surface MS1 together with said second mating surface MS2.

The same method may also be applied at the preform stage, prior to the drawing into thinner fibers.

Figure 14B:
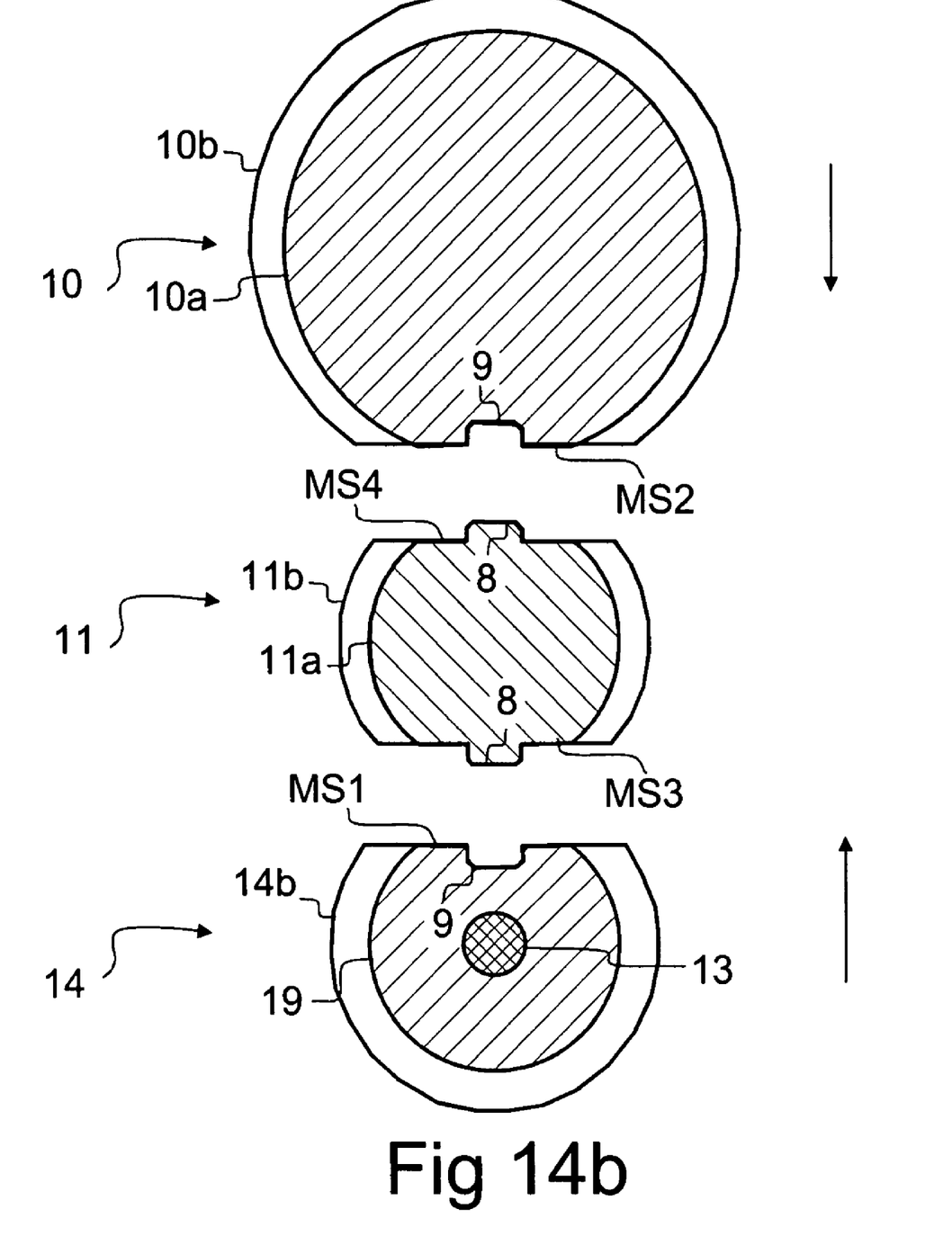
FIG. 14b shows, in a cross-sectional view, a method for producing a bridge fiber.

Referring to FIG. 14b, a glass-clad bridge fiber may be produced by fusing a glass-clad pump element 10, a glass-clad bridge element 11 and a glass-clad active element 14 together. The separate glass-clad pump element 10 comprises an inner portion 10a and an outer portion 10b. The separate glass-clad bridge element 11 comprises an inner portion 11a and an outer portion 11b. The separate glass-clad active element 14 comprises a first cladding 19 (see FIG. 1) and a second cladding 14b. The elements 10, 11, 14 may further comprise one or more grooves 9 and ridges 8 in order to facilitate positioning and fusing.

Initially, the outer portion 10b surrounds the inner portion 10a. The outer portion 11b surrounds the inner portion 11a. The second cladding 14b surrounds the first cladding 14a.

The glass claddings are at least partially removed from the mating surfaces MS1, MS2, MS3, MS4 of the elements 10, 11, 14 prior to the fusing.

Upon the fusing, the outer portion 10b, the outer portion 11b, and the second cladding 14 b are joined together to form the substantially continuous cladding layer 20 (See FIG. 6), which surrounds the pump element 10, the ridge element, and the active element 14.

The continuous cladding 20 has a lower refractive index than the inner portions 10a, 11a and the first cladding 19, in order to confine light.

A method of producing a glass-clad fiber arrangement may thus comprise:
  providing a glass-clad pump element 10 comprising an inner portion 10a and an outer portion 10b,
  providing a glass-clad bridge element 11 comprising an inner portion 11a and an outer portion 11b,
  glass-clad active element 14 comprising a first cladding 19 (see FIG. 1) and a second cladding 14b,
  at least partially removing the outer portion 10b from a first mating surface MS1 of said pump element,
  at least partially removing the first cladding 19 from a second mating surface MS2 of said active element,
  at least partially removing the outer portion 11b from a third MS3 and a fourth mating surface MS4 of said bridge element 11,
  fusing said first mating surface MS1 together with said third mating surface MS3, and
  fusing said second mating surface MS2 together with said fourth mating surface MS4.

The same method may also be applied at the preform stage, prior to the drawing into thinner fibers.

Figure 15:
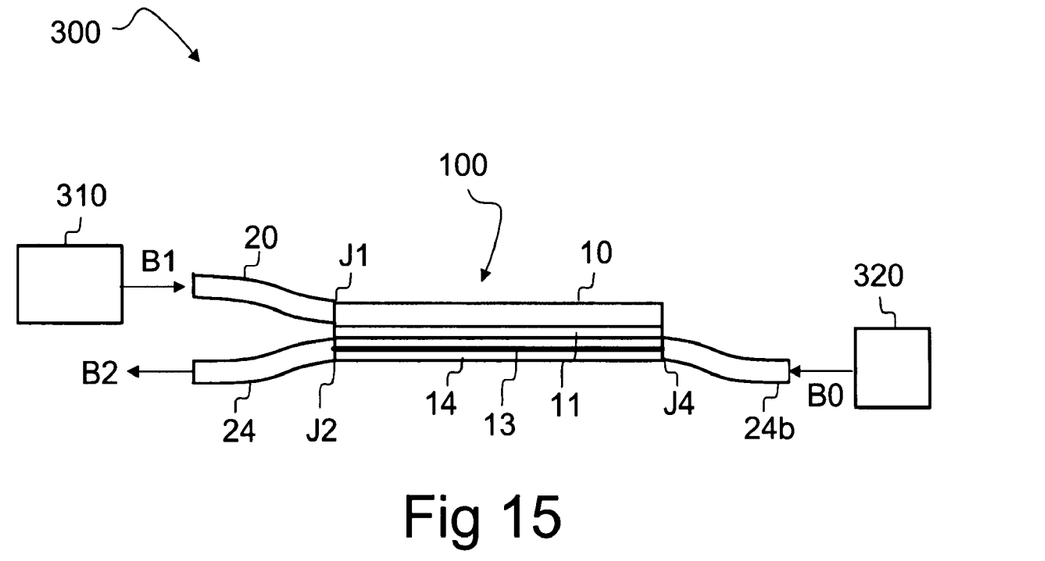
FIG. 15 shows a laser device based on a bridge fiber.

Referring to FIG. 15, a fiber optic laser 300 may comprise a seed light source 320 to provide seed light B0, a pump light source 310 to provide pump light B1, and a bridge fiber 100. The seed light source 320 provides seed light B0 at a predetermined wavelength. The seed light source may be a laser or a combination of a light-emitting diode and a narrowband optical filter. The pump light source B1 may be based on one or more diode lasers.

Thus, the laser 300 may comprise
  a seed light source to provide seed signal light,
  a light-amplifying optical device to amplify said seed signal light, and
  a pump light source to provide pump light,
  said light-amplifying optical device in turn comprising
  a first longitudinal element comprising a core and a first cladding, said core comprising light-amplifying material, said first cladding comprising glass, said first cladding surrounding said core,
  a second longitudinal element, said second element comprising glass, wherein at least a portion of a side of said second element has been fused to at least a portion of a side of said first element in order to allow transverse coupling of pump light from said second element to said first element,
  a third longitudinal element, said third element comprising glass, wherein at least a portion of a side of said third element has been fused to at least a portion of a side of said second element in order to allow transverse coupling of pump light from said second element to said first element, and
  a second cladding surrounding the combination of said first, second, and third elements in order to confine pump light to elements, said second cladding comprising glass,
  wherein said core is adapted to provide amplified signal light by amplifying the seed signal light coupled into said core, said pump light source being coupled into said third element in order to provide pump light for pumping the light-amplifying material of said core.

Amplified signal light B2, i.e. laser light may be coupled out of the active element 14.

The device 300 of FIG. 15 may also be adapted to act as an optical amplifier which is adapted to amplify an optical signal B0 provided by a signal light source. In that case the seed light source 310 is replaced by the signal light source.

Laser 300 may comprise spliced pigtails 20, 24, 24b in order to facilitate coupling of light into and out of the bridge fiber 100.

The laser 300 may comprise a figure-8-fiber 200 instead of the bridge fiber 100.

For a person skilled in the art, it will be clear that modifications and variations of the devices and the methods according to the present invention are perceivable. The particular embodiments described above with reference to the accompanying drawings are illustrative only and not meant to limit the scope of the invention, which is defined by the appended claims.

What is claimed is:

1. A light-amplifying optical device, comprising:
    a first longitudinal element comprising a core and a first cladding, said core comprising light-amplifying material, said first cladding comprising glass, said first cladding surrounding said core,
    a second longitudinal element, said second element comprising glass, wherein at least a portion of a side of said second element has been fused to at least a portion of a side of said first element in order to allow transverse coupling of pump light from said second element to said core through said first cladding,
    a third longitudinal element, said third element comprising glass, wherein at least a portion of a side of said third element has been fused to at least a portion of a side of said second element in order to allow transverse coupling of pump light from said second element to said first element, and
    a second cladding surrounding the combination of said first, second, and third elements in order to confine pump light to elements, said second cladding comprising glass.

2. The device of claim 1, wherein said first element further comprises at least one stress-inducing element arranged to maintain polarization of light propagating in said core.

3. A light-amplifying optical device, comprising:
    a first longitudinal element comprising a core, at least one stress-inducing element arranged to maintain polarization of light propagating in said core, and a first cladding, said core comprising light-amplifying material, said first cladding comprising glass, said first cladding surrounding said core, and
    a second longitudinal element, said second element comprising glass, wherein at least a portion of a side of said second element has been fused to at least a portion of a side of said first element in order to allow transverse coupling of pump light from said second element to said core through said first cladding.

4. The device of claim 3, further comprising:
    a third longitudinal element, said third element comprising glass, wherein at least a portion of a side of said third element has been fused to at least a portion of a side of said second element in order to allow transverse coupling of pump light from said third element to said second element.

5. The device of claim 4, further comprising:
    a second cladding surrounding the combination of said first, second, and third elements in order to confine pump light to elements, said second cladding comprising glass.

6. The device of claim 4, further comprising:
    a second cladding surrounding the combination of said first, second, and third elements in order to confine pump light to elements, said second cladding comprising polymer.

7. A method of splicing optical fibers to a light-amplifying optical device, said device comprising:
    a first longitudinal element comprising a core and a first cladding, said core comprising light-amplifying material, said first cladding comprising glass, said first cladding surrounding said core,
    a second longitudinal element, said second element comprising glass, wherein at least a portion of a side of said second element has been fused to at least a portion of a side of said first element in order to allow transverse coupling of pump light from said second element to said core through said first cladding, and
    a third longitudinal element, said third element comprising glass, wherein at least a portion of a side of said third element has been fused to at least a portion of a side of said second element in order to allow transverse coupling of pump light from said second element to said first element,
    said method comprising:
    splicing a first fiber to an end of said first longitudinal element and splicing a second fiber to an end of said third longitudinal element such that the end of the first longitudinal element and the end of said third longitudinal element are in contact with said second element during said splicing.

8. The method of claim 7, wherein said device further comprises a second cladding surrounding the combination of said first, second, and third elements in order to confine pump light to elements, said second cladding comprising glass.

9. The method of claim 7, wherein said first longitudinal element comprises at least one stress-inducing element arranged to maintain polarization of light propagating in said core.

10. A laser device, comprising:
    a seed light source to provide seed signal light,
    a light-amplifying optical device to amplify said seed signal light, and
    a pump light source to provide pump light,
    said light-amplifying optical device in turn comprising
    a first longitudinal element comprising a core and a first cladding, said core comprising light-amplifying material, said first cladding comprising glass, said first cladding surrounding said core,
    a second longitudinal element, said second element comprising glass, wherein at least a portion of a side of said second element has been fused to at least a portion of a side of said first element in order to allow transverse coupling of pump light from said second element to said core through said first cladding,
    a third longitudinal element, said third element comprising glass, wherein at least a portion of a side of said third element has been fused to at least a portion of a side of said second element in order to allow transverse coupling of pump light from said second element to said first element, and
    a second cladding surrounding the combination of said first, second, and third elements in order to confine pump light to elements, said second cladding comprising glass,
    wherein said core is adapted to provide amplified signal light by amplifying the seed signal light coupled into said core, said pump light source being coupled into said third element in order to provide pump light for pumping the light-amplifying material of said core.

11. An optical amplifier, comprising:
    a light-amplifying optical device to amplify signal light, and a pump light source to provide pump light,
    said light-amplifying optical device in turn comprising
    a first longitudinal element comprising a core and a first cladding, said core comprising light-amplifying material, said first cladding comprising glass, said first cladding surrounding said core, a second longitudinal element, said second element comprising glass, wherein at least a portion of a side of said second element has been fused to at least a portion of a side of said first element in order to allow transverse coupling of pump light from said second element to said core through said first cladding, a third longitudinal element, said third element comprising glass, wherein at least a portion of a side of said third element has been fused to at least a portion of a side of said second element in order to allow transverse coupling of pump light from said second element to said first element, and a second cladding surrounding the combination of said first, second, and third elements in order to confine pump light to elements, said second cladding comprising glass, wherein said core is adapted to provide amplified signal light by amplifying a signal light coupled into said core, said pump light source being coupled into said third element in order to provide pump light for pumping the light-amplifying material of said core.

* * * * *